（12）United States Patent  
Zielke et al.

(10) Patent No.: US 8,875,641 B2  
(45) Date of Patent: Nov. 4, 2014

(54) AGRICULTURAL IMPLEMENT PASS MARKER SYSTEM

(75) Inventors: Roger Zielke, Huxley, IA (US); Allen Myers, Ames, IA (US)

(73) Assignee: Ag Leader Technology, Ames, IA (US)

( * ) Notice: Subject to any disclaimer, the term of this patent is extended or adjusted under 35 U.S.C. 154(b) by 413 days.

(21) Appl. No.: 12/909,336

(22) Filed: Oct. 21, 2010

(65) Prior Publication Data

US 2011/0259618 A1    Oct. 27, 2011

Related U.S. Application Data

(60) Provisional application No. 61/254,353, filed on Oct. 23, 2009.

(51) Int. Cl.
*A01B 69/02* (2006.01)

(52) U.S. Cl.
CPC ............... *A01B 69/02* (2013.01); *Y10S 111/90* (2013.01); *Y10S 111/901* (2013.01); *Y10S 111/923* (2013.01)
USPC ............ 111/200; 111/900; 111/901; 111/923

(58) Field of Classification Search
USPC ......... 111/923, 900–902, 200, 919, 100–104, 111/111, 906
See application file for complete search history.

(56) References Cited

U.S. PATENT DOCUMENTS 4,603,645 A * 8/1986 Wiemeyer ..................... 111/187
6,081,224 A * 6/2000 Rosenbrock .................. 342/104

OTHER PUBLICATIONS

John Deere, GreenStar 2 AutoTrac RowSense Quick Reference Guide.
John Deere AG Management Solutions, The Payoff from Precision, On-Farm Network Conference, Feb. 20, 2008, Scheman Building, Ames, IA.

* cited by examiner

*Primary Examiner* — Christopher J Novosad
(74) *Attorney, Agent, or Firm* — Davis, Brown, Koehn, Shors & Roberts, P.C.; Kent A. Herink

(57) ABSTRACT

A method and apparatus are described for creating a pass marker in a field. During planting, planting of seed is stopped and started on pass marker rows differently than on adjacent rows to create a visible offset to assist a harvester or applicator to find and drive down the right row to prevent skips and overlaps.

9 Claims, 4 Drawing Sheets

AGRICULTURAL IMPLEMENT PASS MARKER SYSTEM

This application claims priority to U.S. Patent Application Ser. No. 61/254,353, filed Oct. 23, 2009, which is incorporated herein in its entirety by this reference.

BACKGROUND OF THE INVENTION

The invention relates generally to agricultural implements and, more specifically, to a method and apparatus for creating a pass marker in row crops to assist in application of agrochemicals and harvesting of the crop.

In many parts of the world, crops are planted in equally spaced rows with large agricultural planters. These equally spaced rows make it convenient for spraying, fertilizing, or harvesting with standard sized equipment. Since the advent of planting crops in rows, farmers have struggled to drive into the correct row of the next pass when turning around. Finding the right row is important because driving down the wrong row produces yield limiting overlaps or skips when applying pesticides and fertilizers.

Counting rows is a common method to find the next pass, but counting accurately is difficult when turning around a 30-foot or 40-foot machine. It becomes more difficult as machine size and swath widths become larger. There are many sprayers that have 80-, 90-, or even 120-foot booms which make even more rows to count. Variation in crop type, crop height, terrain, wind and lighting conditions can also make counting rows difficult.

The problem is also evident when harvesting corn. Many large farming operations now use grain carts and harvest fields in 'lands.' The combine operator strikes through the field in certain spots so they can harvest with their unloading auger always on the harvested side of the field and harvesting in a counter-clock-wise motion. This allows the grain cart to stay close to the combine allowing for more efficient harvesting. When a land is finished, the combine operator then proceeds to strike across another portion of un-harvested crop. The operator usually needs to count rows in multiples of their corn head size so all passes utilize the full width of the head. There are instances where an operator loses count or miscounts and the last pass is either very small (1 or 2 rows) or short of the full width (7 rows on an 8 row head or 11 rows on a 12 row head).

Companies and farmers have tried many solutions to finding the correct row. One method is to predict where to turn back into rows using a GPS navigation display. This feature is known as RowFinder feature. The GPS navigation display will record the current position/heading of the vehicle at the end of a pass, and graphically show where to turn to enter the next pass. The user tries to manually steer the vehicle into the correct row based on the machines location relative to an indicator on the navigation computer screen. However, an expensive high accuracy GPS is required and manually steering into the correct row using a computer screen indicator is difficult to do accurately. It becomes more difficult in crops planted in narrow row spacing, such as 20 or 30 inches. Additionally, GPS assumes all rows have the same spacing, but that is often not the case on a so-called planter guess row which is the row space between the outside rows of adjacent planter passes. Guess row spacing is dependent on driving accuracy relative to the adjacent pass. Row spacing between all other planter rows are fixed because planter row units are mounted to the planter frame at a fixed spacing.

A variation of the RowFinder feature is called iTEC Pro (intelligent Total Equipment Control) by Deere and Company. By using vehicle controller information paired with high accuracy GPS coordinates, this system actually turns the tractor around automatically at the end of the field. The user does not turn the steering wheel at all during the process. While convenient and very accurate, this method is expensive and only compatible with the newest tractors and equipment. It also does not account for variation in planter guess row spacing.

Another prior art is planting a unique variety, or pass marker variety, in rows that subsequent machines will use to locate their passes. The problem is the pass marker variety is not always distinguishable from the variety of adjacent rows. Further, the pass marker variety may not yield as much as the desired variety. It also creates slower planter fill times compared to one variety in all rows.

SUMMARY OF THE INVENTION

The invention is a method on a planter or seeder to offset the start and stop of planting on pass marker rows relative to adjacent rows. It is preferable for the offset of each pass marker row to produce a gap of unplanted crop each time planting starts or stops. After the crop has emerged, the gap in plants serves as an in field mark to show the farm machine operator which rows to travel down to prevent skips and overlaps for each pass.

DESCRIPTION OF THE INVENTION

In accordance with the present invention, a pass marker is created to mark rows of a crop planted in an agricultural field so that an operator of agricultural equipment can easily line up with the pass rows to more efficiently carry out agricultural operations. The methods and apparatus of the present invention create gaps and/or overlaps at the beginning and ending of row or rows of crops to create an easily seen marker. A control system running on a digital microprocessor controls the operation of a planter to either interrupt planting of seed to create a gap in the pass marker rows or to continue planting seed past the ordinary cutoff line to create an overlap in the pass marker rows. The invention is particularly suited to precision agriculture equipment with automatic swath control where the beginning and end of rows are automatically recognized by the agricultural equipment or related systems, such as by the interaction of a GPS system and a map of the field being planted. The control system is used to carry out the system of gaps and/or overlaps as defined by the user or operator.

Control Logic

Figure 1:
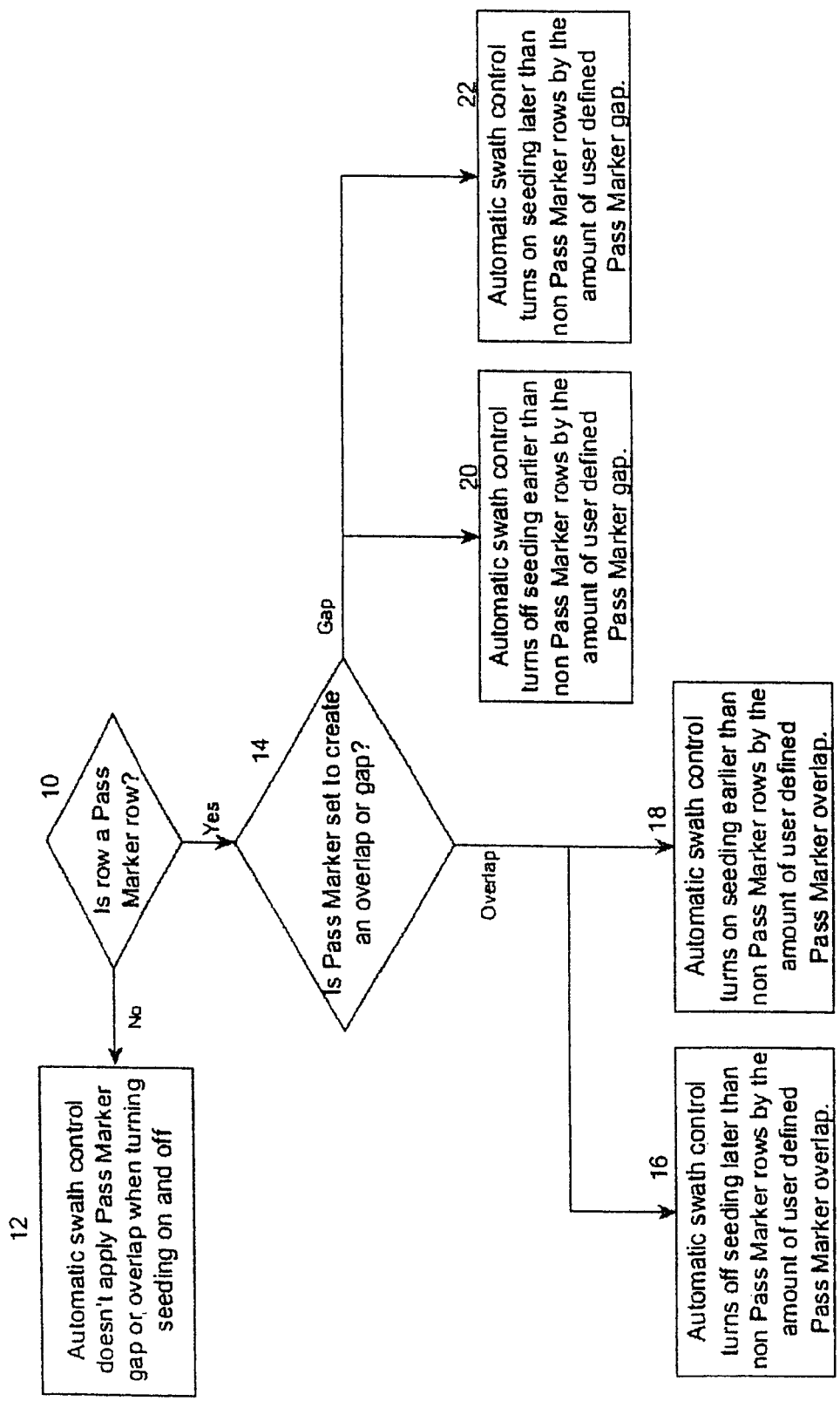
FIG. 1 is a flow chart diagram of a control system of the present invention.

Referring to FIG. 1, the controller is programmed to monitor pass marker rows as defined by the operator corresponding to the agricultural equipment being used. If the row shutoff device being controlled does not correspond to a pass marker row, the decision at 10 is "No" and the controller does not apply pass marker gap or overlap when turning seeding on and off, as indicated at 12. If the row shutoff device being controlled does correspond to a pass marker row, the decision at 10 is "Yes" and the controller then asks at 14 whether the pass marker has been set to create an overlap or a gap. If an overlap is selected, the controller either turns off seeding later than non pass marker rows by the user defined amount, indicated at 16, or the controller either turns on seeding earlier than non pass marker rows by the user defined amount, indicated at 18, as defined by the operator or user. If a gap is selected, the controller either turns off seeding earlier than non pass marker rows by the user defined amount, indicated at 20, or the controller either turns on seeding later than non pass marker rows by the user defined amount, indicated at 22, as defined by the operator or user.

The controller may preferably be configured to automatically reassign which rows are pass marker rows based on a prediction of the travel path of a particular agricultural implement that will traverse the field at a later time.

In an exemplary application of this embodiment, a 16-row, 30" row space (40 ft) planter is used to plant the crop in a serpentine pattern starting on one side of the field. A 60 foot sprayer is used to apply pesticides in a serpentine pattern starting on the same side of the field as the planter. The automatic swath controller reassigns the rows that are pass marker rows as the planter traverses the field to create pass marks every 60 feet. The controller assigns planter rows 4 and 5 as pass marker rows on the first planter pass. This puts the sprayer's first pass 30 feet (½ of sprayer width) from the edge of the field. The controller assigns no rows as pass marker rows on the second planter pass. The controller assigns planter rows 11 and 12 as pass marker rows on the third planter pass. This puts the sprayer's second pass 60 feet from the sprayer's first pass.

Time Delay Relay Method

In one embodiment of the invention, a time-delay relay is used to delay planting on pass marker planter rows to produce a small gap relative to adjacent rows. The relay connects between a row shutoff device (such as a clutch described in U.S. patent application Ser. No. 12/228,075, which is incorporated herein in its entirety by this reference) and automatic swath controller and delays the shut off device from turning seeding on by a predetermined time from when the controller signals the shutoff device to turn on. Each row shutoff device is associated with an individual seed meter and so controls the planting or interruption in planting of seed from its associated seed meter.

Figure 2:
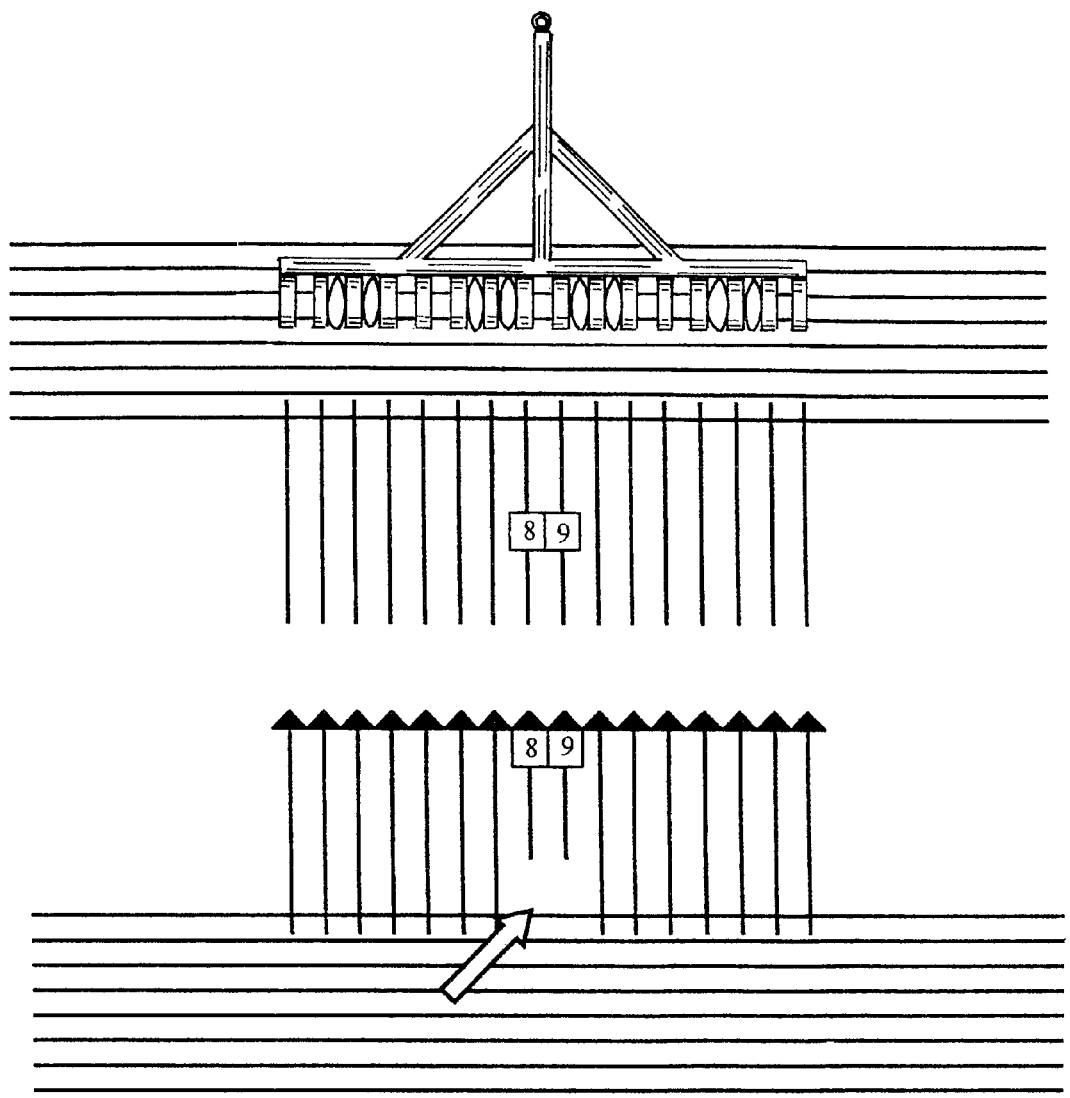
FIG. 2 is a schematic diagram illustrating the time delay relay method of creating a pass marker.

The time delay relay only creates a pass mark (in the form of a gap) at the beginning of a planter pass (FIG. 2). More specifically, it creates a gap whenever the automatic swath controller goes from a "planting off" to "planting on" state. It is more useful to have a pass marker gap at the end of each planter pass because it eliminates the need to synchronize turns with the ends that have pass markers.

Automatic Swath Controller with Independent Row Fore/Aft Offset Distance

Figure 3:
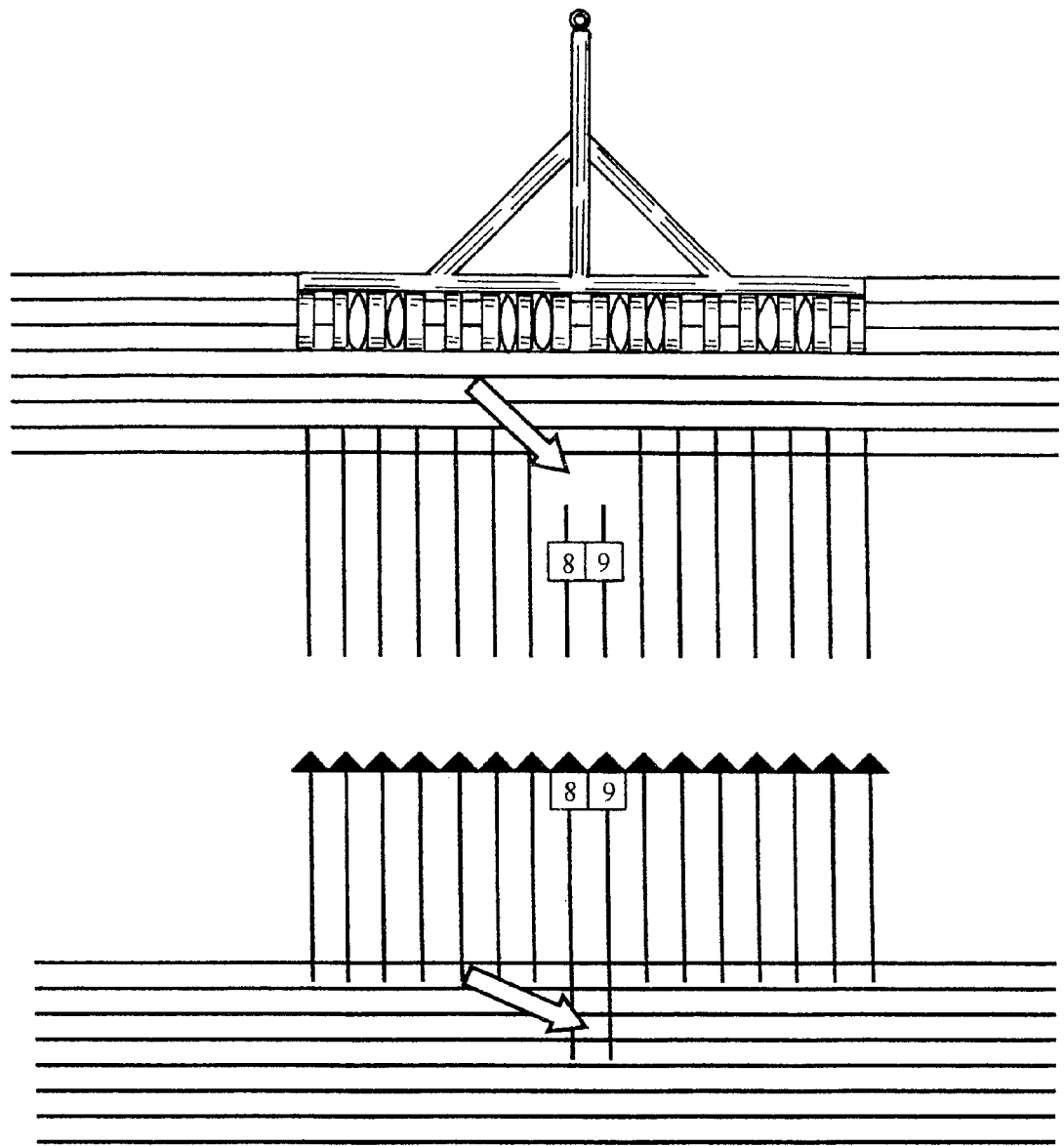
FIG. 3 is a schematic diagram illustrating the independent row offset method of creating a pass marker.

In an alternative embodiment of the present invention, an automatic swath controller is used to delay planting on pass marker rows by using a false fore/aft distance relative to adjacent rows. The controller is connected to each row shutoff device and can be set to turn seeding on or off for each individual row shutoff device at user defined intervals. Whenever the automatic swath controller turns planting on, the shutoff devices on seed meters that are planting pass marker rows are delayed to start planting relative to adjacent rows by the false fore/aft distance. Whenever the automatic swath controller turns planting off, pass marker rows are delayed to stop planting relative to adjacent rows by the false fore/aft distance. For crops that have end rows, this effectively produces an overlap on one end of the pass (see the arrows in FIG. 3). The disadvantage of an overlap in crops with end rows is the crop leaves will commonly grow big enough to cover the row spaces, which makes the overlap no longer stand out from surrounding crop. This causes the overlap to cease functioning as a pass marker. This method does create a pass marker gap that can be used throughout the growing season, but it is on only one end of the pass, as in the time delay relay method previously described. This method does create a useful pass marker on both ends of the pass in crops that do not have end rows.

Automatic Swath Controller with Independent Row Turn On/Off Delay

Figure 4:
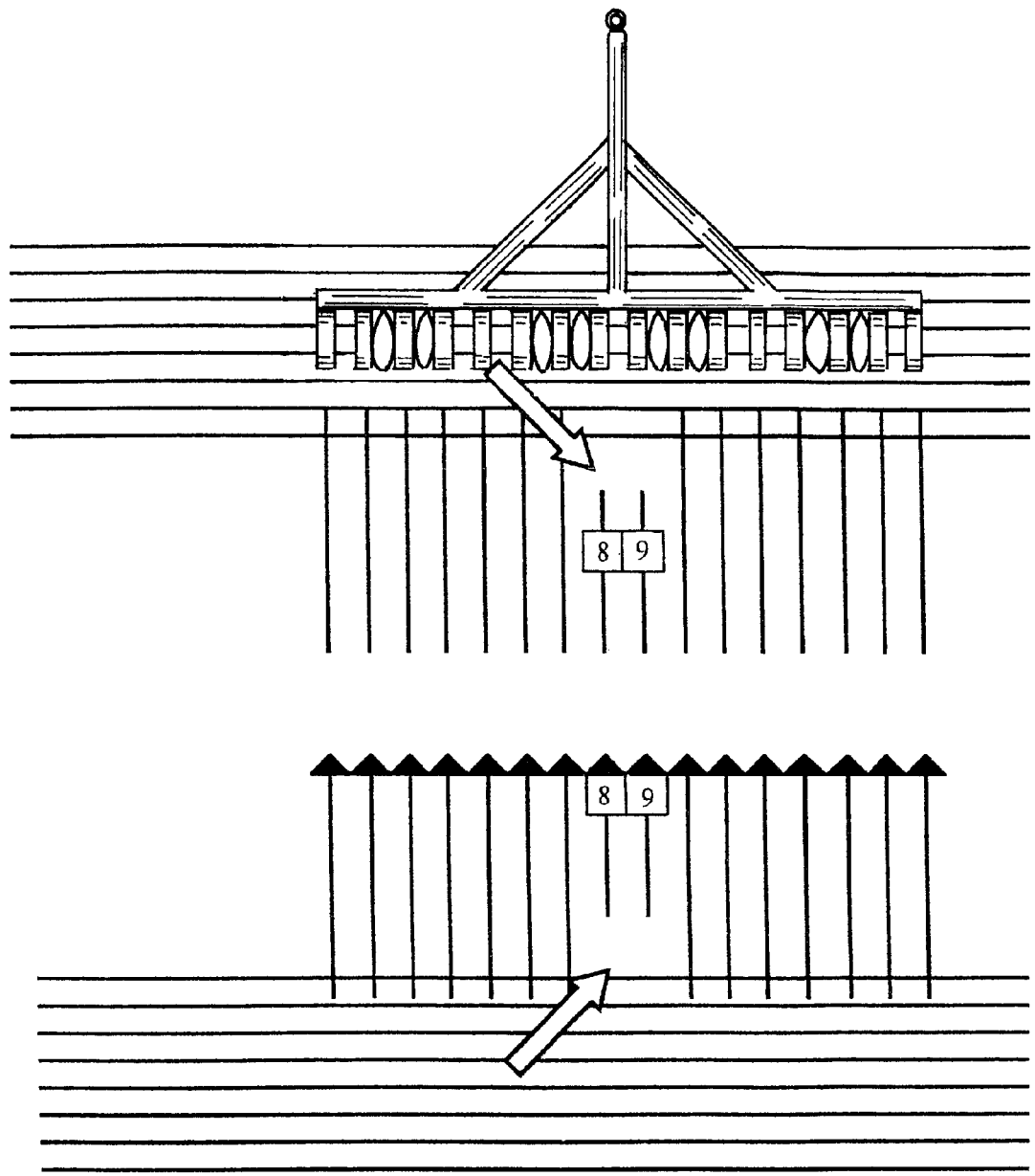
FIG. 4 is a schematic diagram illustrating the independent turn on/off delay method of creating a pass marker.

In yet another embodiment, an automatic swath controller produces a gap of unplanted crop in the pass marker rows at both ends of each pass by: (1) Turning planting on later than adjacent rows at the beginning of rows; and (2) turning planting off before adjacent rows at the end of rows. The length of the pass marker gap is defined in the automatic swath controller based on time or linear distance. This method produces a pass marker gap on both ends of the pass, as highlighted by the arrows in FIG. 4. Alternatively, the controller could be set to start planting earlier than adjacent rows and stop planting later than on adjacent rows to create an overlap at both ends of each pass of the planter. The controller can also be set such that a selected seed meter produces a gap at the end of a row while a different selected seed meter produces an overlap at the end of the row, and conversely.

EXAMPLE

In this example, a 16-row, 30" row space planter is used to plant the crop and an 8-row, 30" row space corn head is used to harvest the crop. A 15-row, 30" row space side dress applicator is used to apply fertilizer and a 120 foot sprayer is used to apply pesticides.

Rows 8 and 9 of the planter are pass marker rows producing a 3 foot gap of unplanted corn at the end of each pass. The tractor pulling the 15-row side-dress applicator finds the next pass by straddling the pass marker rows 8 and 9. Commonly, tractor wheels are set on 60 inch centers (30 inch row spacing) which straddles two rows. The sprayer finds the next pass by straddling pass marker rows 8 and 9 of every third planter pass. Commonly, sprayer wheels are set on 120 inch centers (30 inch row spacing), and so straddle four rows. The combine operator finds a pass to make a new headland by lining up row 1 or row 8 of the corn head with pass marker row 8 or 9.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto. Those skilled in the art who have the disclosure before them will be able to make modifications and variations therein without departing from the scope of the invention.

We claim:

1. A method for creating a pass marker in a field, comprising the steps of starting and stopping the planting of seed on a pass marker row differently than on an adjacent row to create a visible offset to guide an agricultural machine as the agricultural machine traverses the field at a later time.

2. A method as defined in claim 1, wherein starting and stopping of planting of seed on a pass marker row is later than on an adjacent row.

3. A method as defined in claim 1, wherein starting and stopping of planting of seed on a pass marker row is earlier than on an adjacent row.

4. A method as defined in claim 1, wherein starting of planting of seed on a pass marker row is later than on adjacent rows and stopping of planting of seed on a pass marker row is earlier than on an adjacent row.

5. A method as defined in claim 1, wherein starting of planting of seed on a pass marker row is earlier than on adjacent rows and stopping of planting of seed on a pass marker row is later than on an adjacent row.

6. A method as defined in claim 1, wherein starting of planting is set independently on pass marker rows to be earlier or later than starting of planting on adjacent rows.

7. A method as defined in claim 1, wherein stopping of planting is set independently on pass marker rows to be earlier or later than stopping of planting on adjacent rows.

8. A method as defined in claim 1, wherein said steps of starting and stopping are carried out by a control system running on a microprocessor.

9. A method as defined in claim 8, wherein a plurality of passes are made through the field and said control system changes the pass marker row between passes based on a prediction of the travel path of a particular agricultural implement that will traverse the field at a later time.

\* \* \* \* \*